Figure 1:
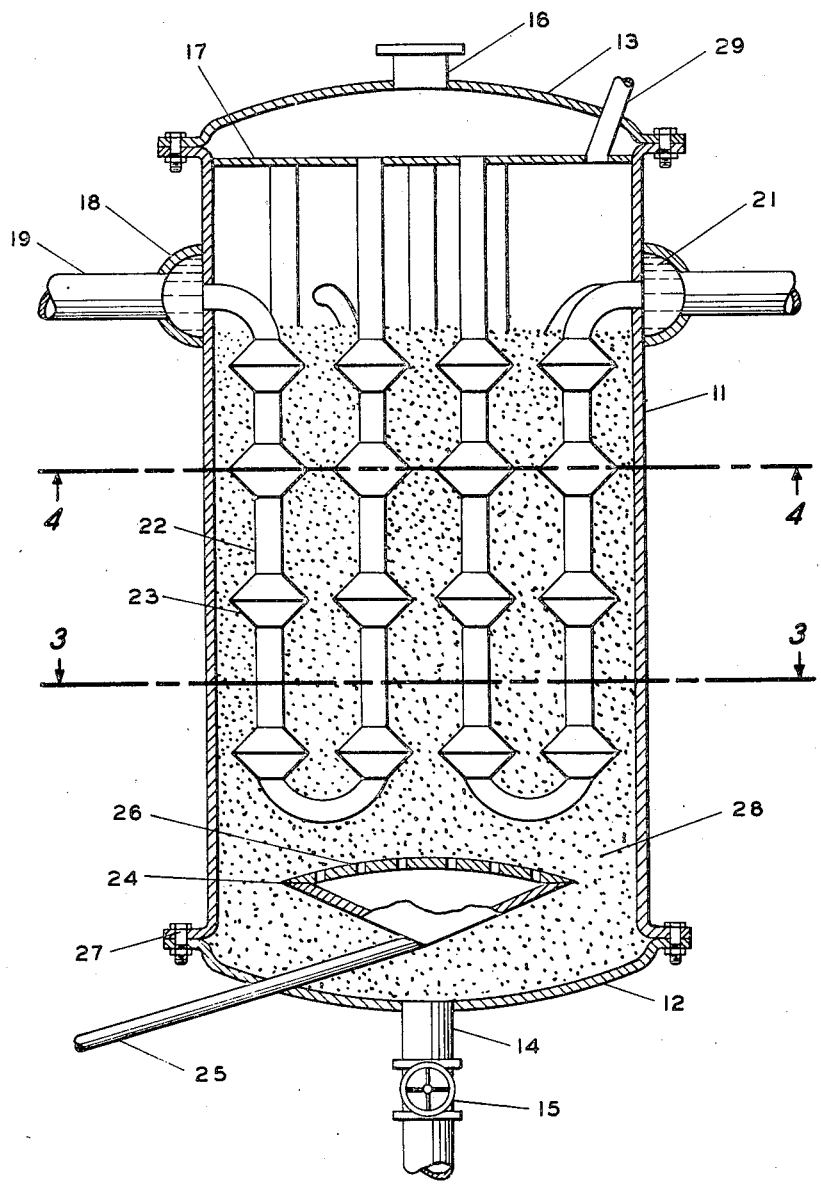

March 14, 1950

A. CLARK 2,500,519

PROCESS AND APPARATUS FOR THE
SYNTHESIS OF HYDROCARBONS

Filed Oct. 14, 1947

4 Sheets-Sheet 1

INVENTOR.
A. CLARK

BY *Hudson and Young*

ATTORNEYS

Patented Mar. 14, 1950

2,500,519

UNITED STATES PATENT OFFICE 2,500,519

PROCESS AND APPARATUS FOR THE SYNTHESIS OF HYDROCARBONS

Alfred Clark, Bartlesville, Okla., assignor to Phillips Petroleum Company, a corporation of Delaware Application October 14, 1947, Serial No. 779,673

10 Claims. (Cl. 260—449.6)

This invention relates to the synthesis of organic compounds by the reaction of an oxide of carbon with hydrogen. In one of its more specific aspects it relates to the synthesis of hydrocarbons by the reaction of carbon monoxide with hydrogen in a fluidized fixed-bed conversion chamber.

In the process of synthesizing organic compounds, which is known to the petroleum industry as Fischer-Tropsch synthesis, an oxide of carbon, e. g., carbon monoxide, and hydrogen are reacted together at suitable elevated temperatures in the presence of a selected catalyst to yield higher boiling organic compounds including hydrocarbons ranging from light gaseous methane to heavy liquids or waxes. Catalysts commonly used for this synthesis are sintered iron, and compounds or compositions comprising cobalt, nickel and/or ruthenium. These catalysts may be promoted with such materials as alkali metals, alkaline earths, or their oxides, or with thoria or various other promoters. The catalysts may be utilized in either a static fixed-bed or in a fluidized-bed. In fixed-bed operations it is common practice to support the catalyst on an inert supporting material, such as kieselguhr, or the like. Such support materials may be crushed to any desired mesh size. It is common practice to dissolve the catalyst material and the promoters in a suitable liquid solvent, which mixture is then mixed with the support material, and the promoter and catalyst materials are precipitated from their solution by means of an alkaline solution. When utilizing the fluidized catalyst modification of this synthesis, in which a catalyst in the form of a freely flowing powder is normally suspended in the gaseous material passing through the reaction zone, the promoter material is usually fused into the catalyst and the resulting hard mass is ground to a relatively hard, abrasion-resistant powder.

When synthesizing hydrocarbons utilizing a static fixed catalyst bed it has been necessary to operate at relatively low space velocities, such as between about 100 and about 300, and the rate of production of hydrocarbons heavier than ethane has been undesirably low. It has recently been found that when fluidized fixed-bed operation is applied to the Fischer-Tropsch process space velocities and consequently the production rate can be greatly increased. Thus, whereas in static fixed-bed operation, space velocities of about 100 to about 300 are used, in fluidized fixed-bed operations, space velocities as high as 5000 may be used, and a correspondingly increased rate of production of hydrocarbons heavier than ethane may be obtained. In fluidized fixed-bed operation, the synthesis gas, which comprises carbon monoxide and hydrogen in a molar ratio of from about 1:2 to 2:3, is contacted with a finely ground catalyst at such a linear velocity that the catalyst is continually agitated, but is not substantially carried out of the reactor.

Although fluidized fixed-bed operation permits increased space velocities, it also entails certain problems. One such problem is that of maintaining the linear velocity of the synthesis gas sufficiently high through the length of a reactor to maintain catalyst fluidization and, at the same time, sufficiently low to prevent undesirably high yields of light hydrocarbons, such as methane, and also to prevent undesirably high temperatures near the inlet of the reactor. This problem is accentuated in the Fischer-Tropsch process since as a result of the union of carbon monoxide with hydrogen to form normally liquid products, the gas volume continuously decreases during passage through the reactor. A second problem in such a process is that of controlling the temperature within the reactor when the reactor is of such size as to react relatively large volumes of synthesis gas at one time. Another problem is that of maintaining the catalyst in an active state when heavy liquids or waxes form a portion of the reaction products.

An object of the present invention is to provide an improved reactor for the synthesis of hydrocarbons by the reduction of carbon monoxide with hydrogen. Another object is to provide an improved reactor for such synthesis in which fluidization of the catalyst is facilitated. Another object is to provide an improved reactor for such synthesis in which the removal of heat of reaction is facilitated. Another object is to provide an improved method of conducting the synthesis of hydrocarbons by catalytic reduction of carbon monoxide and hydrogen. Another object is to provide a method for maintaining linear velocities through a reactor. Another object is to prevent undesirably high temperatures near the inlet of a reactor. Another object is to provide means for withdrawing a substantially inactive catalyst from a reactor. Other and further objects will be apparent to those skilled in the art upon study of the accompanying description and drawings.

The present invention provides a solution for the above mentioned problems. Understanding of the invention will be facilitated by reference to the accompanying diagrammatic drawings.

Figure 2:
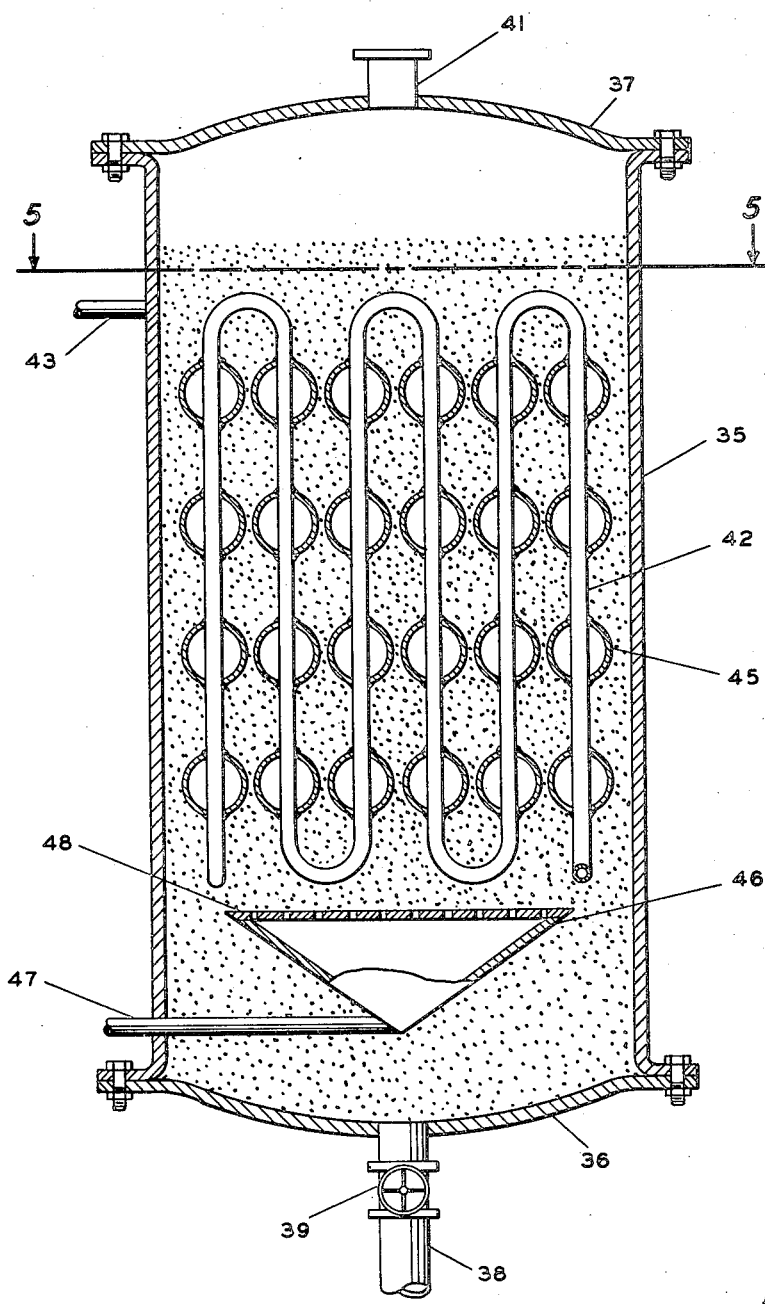
Figure 3:
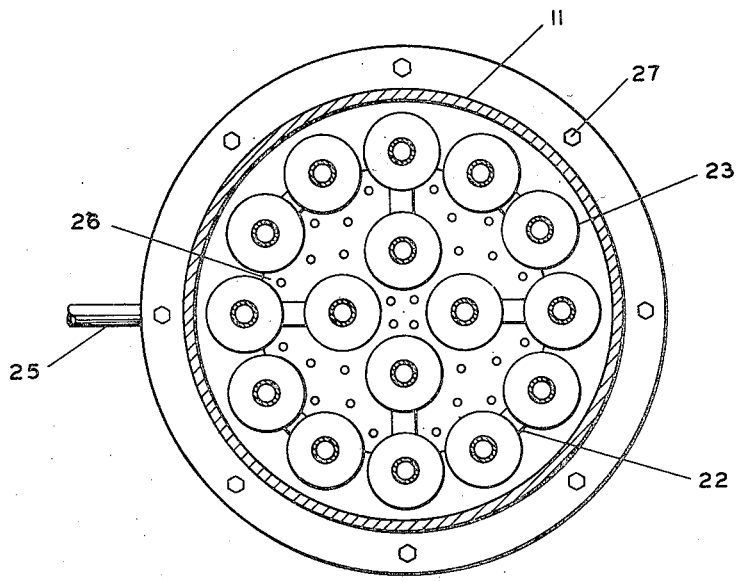
Figure 4:
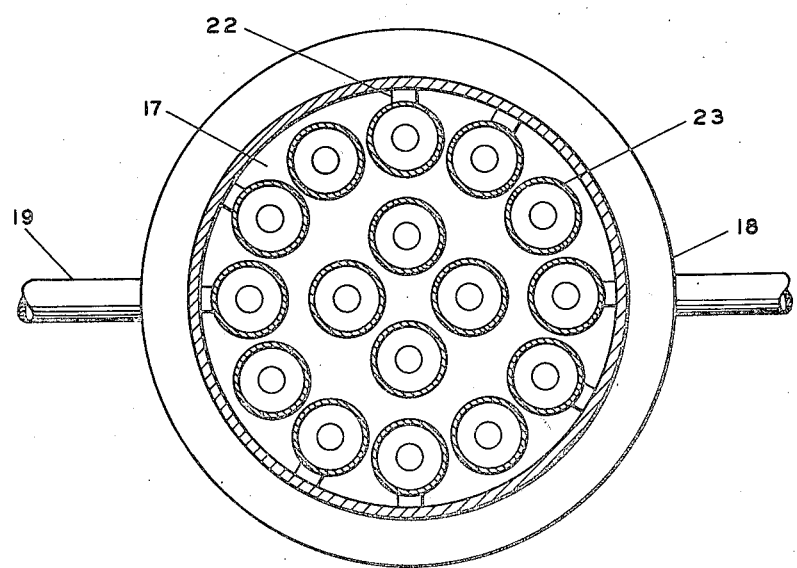
Figure 5:
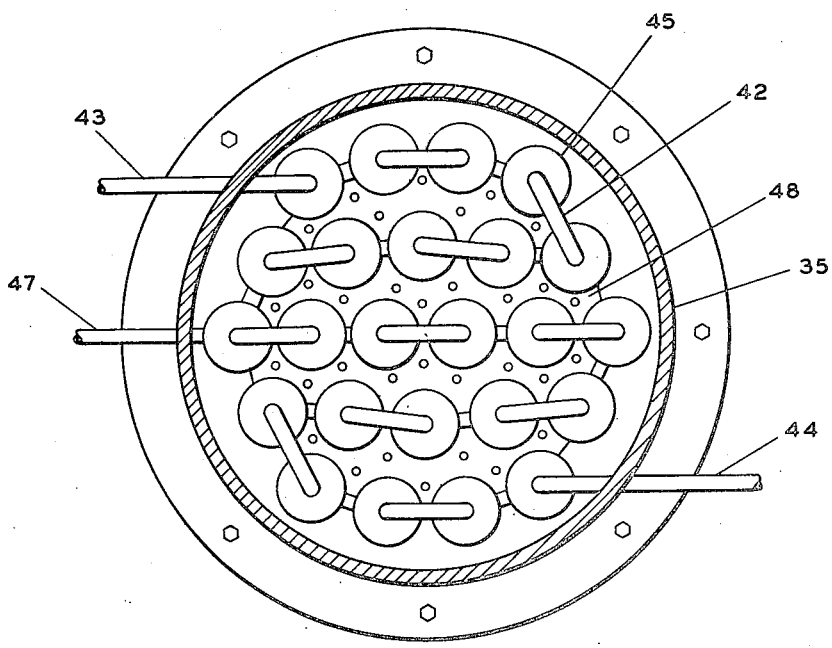
Figure 6:

Figure 1 is a section view of a reactor designed in accordance with and showing a preferred embodiment of the invention. Figure 2 is a section view of a reactor also designed in accordance with and showing a modification of the invention. Figure 3 is a horizontal plan view taken along the line 3—3 of Figure 1. Figure 4 is a horizontal plan view taken along the line 4—4 of Figure 1. Figure 5 is a horizontal plan view taken along the line 5—5 of Figure 2. Figure 6 is a section view of a modified cooling coil for use in the reactor.

The reactor of Figure 1 comprises a substantially vertically disposed cylindrical reaction chamber 11 which is closed at each end by closure means, such as removable closure members 12 and 13 and enclosing a reaction zone therein. Catalyst outlet means, such as conduit 14, having closure means, such as valve 15, positioned therein is provided in the lower portion of the chamber, such as is closure member 12. Closure means 13, in the top of said chamber, is provided with coolant outlet means, such as conduit 16. The upper portion of the reaction zone enclosed within reaction chamber 11 is closed by baffle means, such as member 17. Member 17 is affixed at its outer periphery to reaction chamber 11 by a gas tight seal. Coolant inlet means, such as bustle ring 18, are provided adjacent the upper portion of reaction chamber 11. Coolant conduit 19, communicates between a coolant supply source and the coolant inlet means. Cooling means, such as a plurality of cooling coils 22, are provided within the reaction chamber and enclose cooling zones therein. The cooling coils communicate between the coolant inlet means and that portion of the chamber above member 17. Coils 22 preferably extend downwardly, from the point of communication with the coolant inlet, into the lower portion of the reaction zone enclosed within reaction chamber 11, at which point they make a return bend and extend upwardly through member 17. Cooling coils 22 are provided with enlarged portions 23 at adjacent points and at spaced intervals through the length of the coils. By these enlarged portions the reaction zone enclosed within reaction chamber 11 is divided into a plurality of substantially unrestricted reaction zone portions and into a plurality of restricted zones. Reactant material inlet means, such as header 24, is provided in the lower portion of the reaction chamber. Reactant material conduit 25 communicates between a reactant material supply source and header 24. Header 24 is preferably conical in shape and is closed at its enlarged upper end by closure means, such as perforate closure member 26. Closure members 12 and 13 may be rigidly affixed to reaction chamber 11 in any conventional manner, such as by bolts 27.

Particulate or powdered catalyst 28 is provided within the reaction chamber, e. g. the lower half of the reaction zone may be filled with catalyst before start up. Such catalyst will be distributed throughout the length of the reaction zone by the flow of synthesis gas. Catalyst 28 may be any one of the catalysts suitable for the reaction being carried out. It is preferred, for a Fischer-Tropsch synthesis, to use a catalyst prepared by fusing iron oxide, cooling and grinding the fused material to a size within the range of from about 65 to about 100 mesh, and reducing the ground material with hydrogen. Alkaline promoters, such as potassium carbonate or barium hydroxide, may be incorporated if desired.

The enlarged portions 23 of cooling coils 22 may be either equally spaced along the length of cooling coils 22 through a substantial length of the reaction chamber, or the space between the enlarged portions may be progressively decreased from the bottom to the top of the reaction coils. When the enlarged portions are substantially equally spaced along the coil and so positioned that they are adjacent one another, the reaction zone within reaction chamber 11 is divided into a plurality of substantially unrestricted reaction zone portions, which portions have substantially equal volumes. The diameter of the coil sections connecting the enlarged portions may be progressively increased from the bottom of the cooling coils to the top, as shown in Figure 6 of the drawings, thus progressively decreasing the horizontal areas of the substantially unrestricted zone portions from the bottom to the top of the reaction chamber. The cross-sectional diameter of the expanded coil sections is preferably at least four times the diameter of the tube forming the coil.

In the operation of the reactor shown in Figure 1, synthesis gas containing hydrogen and carbon monoxide is introduced, in a molar ratio of from about 1:2 to about 3:2, through inlet conduit 25 and inlet header 24. If the substantially unrestricted portions of the reaction zone are of substantially equal horizontal area an inert diluent, such as nitrogen, may be introduced into the reaction zone with the synthesis gas. As the synthesis gas enters into header 24 its velocity decreases due to the enlarging volume of the conical shaped member. The gas then passes through the perforations in closure member 26 at an increased velocity. In that manner particulate catalyst in the lower portion of the reaction zone is fluidized, thus furnishing a good contact area for the synthesis gas. As the synthesis gas, together with entrained reaction products and a portion of entrained catalyst, passes upwardly in the reaction zone, it is caused to pass through the restricted area formed by the enlarged portions of the cooling coils at a velocity substantially greater than the gas velocity within the substantially unrestricted portion of the reaction zone below the restricted area. The velocity in this restricted zone is also greater than the velocity of free fall of particles through the gaseous mixture. As the synthesis gas, together with reaction products, passes through the restricted zone, it is caused to contact the substantially large cooling surface furnished by the enlarged portion of the cooling coils. In that manner, heat of reaction is removed from the reaction zone by coolant 21 within the cooling coils. Upon passing through the restricted area at the increased velocity, the synthesis gas and reaction products substantially fluidize catalyst material within the substantially unrestricted zone portion between the first and second restriction areas. As more reaction products are formed, the volume of synthesis gas decreases. Where an inert diluent, such as nitrogen, is used the diluent will act to maintain the velocity of flow through the restricted area, thus fluidizing catalyst material within each succeeding substantially unrestricted zone portion. In those cases where each succeeding portion of reaction zone has a smaller horizontal area, it will not be necessary to utilize a diluent for the purpose of maintaining a fluidizing velocity through the reaction zone. By means of the succeeding smaller zone portions, the synthesis gas though depleted in volume will be enabled to maintain a sufficiently high linear velocity to fluidize the catalyst therein. The area above the last restricted zone is substantially extended so as to provide a settling zone wherein entrained catalyst material may be allowed to settle from the synthesis gas and reaction products. The effluent is removed through outlet means, such as conduit 29. The coolant is ordinarily introduced into the cooling system at a temperature just below its boiling point. On passing through the succession of enlarged and restricted portions of the cooling system, the coolant will become vaporized and will thus remove the heat of reaction as heat of vaporization. Upon being vaporized, the coolant passes into the portion of the chamber above member 17 and is removed through conduit 16. During the reaction process heavy liquids and/or wax will be among those products formed and will tend to deposit upon the catalyst material. That portion of the catalyst material bearing such deposits, being heavier than the other catalyst material, will tend to settle to the bottom of the reaction chamber. Such catalyst material is removed from the reaction chamber through conduit 14 and closure 15 and is passed to a regeneration chamber where the heavy deposits are removed therefrom. A portion of the remaining catalyst may be substantially inactivated by the deposition of carbonaceous material thereon. When the catalyst material has reached an undesirable state of inactivity, the reactant materials may be shut off from the reaction zone and oxygen-containing regeneration gas together with a diluent, such as steam, may be introduced into the reaction zone through conduit 25 and header 24. In that manner the catalyst material may be regenerated in situ. Separation means (not shown), such as a cyclone separator or a Cottrell electric precipitator, may be provided in conduit 29 for the purpose of removing entrained catalyst material from the effluent stream. Such separated catalyst material may be recycled and introduced, with any makeup catalyst material, into conduit 25. Regeneration of the catalyst, in situ may also be carried out by passing hydrogen through the catalyst chamber.

The reactor of Figure 2 is similar to that of Figure 1. It comprises a reaction chamber 35 which is closed at its ends by closure means, such as closure member 36 and member 37. Catalyst outlet means, such as conduit 38, is provided in the bottom of a reaction chamber and has closure means, such as valve 39, provided therein. The reactor is provided in its upper portion with effluent outlet means 41. Cooling means, such as cooling coils 42, are provided within the reaction chamber and are preferably connected in series. Coolant inlet means, such as conduit 43, is provided in the reaction chamber and communicates between a coolant supply zone and one end of the serially extending coils. Coolant outlet means, such as conduit 44, (shown in Figure 5) is provided in the reaction chamber, communicating between the other end of cooling coils 42 and the exterior of the reaction chamber. The outer diameter of the cooling coils is enlarged at adjacent points throughout the length of the coils by enlargement means, such as thin bulbular members 45, affixed to the exterior of the cooling coils. These bulbular members divide the reaction zone, enclosed within reaction chamber 35, into substantially unrestricted reaction zone portions and restricted portions. The unrestricted reaction zone portions may have substantially equal horizontal areas or the diameter of the coil between the bulbular enlargements may be increased from the bottom to the top of the coils so as to form zone portions which decrease progressively in horizontal area from the lowest substantially unrestricted zone portion to the top of such portion. Reactant material inlet means, such as header 46, is provided in the lower portion of the reaction zone, and reactant material inlet conduit 47 communicates between a reactant material supply source and header 46. Header 46 is preferably conical in shape and is closed at its enlarged upper end by closure means, such as perforate closure member 48. Particulate or powdered catalyst, similar to that used in the device shown in Figure 1, is provided within reaction chamber 35. The operation of the device shown in Figure 2 is similar to that of the device of Figure 1. If additional cooling area is desired for the reaction chamber, a cooling jacket (not shown) may be provided about the exterior of the reaction chamber.

Suitable reaction conditions in a Fischer-Tropsch process using a reactor of the present invention are a temperature within the range of between about 300 and about 320° C., a pressure of about 10 and about 20 atmospheres, and an overall space velocity between about 1500 and about 5000 volumes (STP) of synthesis gas per volume of catalyst per hour.

The number of substantially unrestricted reaction zone portions within the reaction chamber is not to be limited to the specific number shown in the drawings. It is necessary only that a sufficient length of the reaction space be provided in the reaction chamber in which the desired reaction of the synthesis gas may be obtained. Any additional conventional method may be utilized to progressively decrease the volume of the reaction zone portions from the bottom to the top of the reactor, such as by shortening the distance between the enlarged portions or increasing the length of the enlarged sections, thus in effect decreasing the distance between the sections.

Temperatures in a Fischer-Tropsch process must be confined within relatively narrow ranges, depending upon the catalyst used. These temperatures, for the specific catalyst, are well known to those skilled in the art. One of the advantages of the reactor constructed in accordance with this invention as compared with conventional cylindrical reactors is that increased efficiency is obtained in the removal of heat of reaction produced by the reaction of the carbon monoxide with the hydrogen. The increased efficiency of heat removal is a result of the relatively large cooling coil space exposed to the reactor materials.

*Example*

A gaseous mixture comprising 30 volume per cent hydrogen, 15 volume per cent carbon monoxide, together with 55 volume per cent comprising nitrogen, methane, and other inerts is passed through a Fischer-Tropsch reactor containing a 60–100 mesh reduced iron catalyst. The reactor is a vertical steel cylinder provided internally with vertical cylindrical cooling tubes, through which oil is circulated to remove heat of reaction. Under reaction conditions of an initial temperature of 320° C., a pressure of 200 p. s. i., and a space velocity of 2500 gas volumes (STP) per volume of catalyst per hour, the catalyst near the inlet is satisfactorily fluidized, but the catalyst further downstream is not. Most of the uneven fluidization occurring in the upper part of the catalyst bed is a result of the normal contraction of the gas during the reaction. Undesirably large amounts of methane, carbon dioxide, and carbon are formed. Increasing the apparent linear velocity of gas through the reactor improves fluidization, but makes temperature control more difficult and causes undesirably large amounts of catalyst to be blown out of the reactor.

The cooling tubes are replaced with cylindrical tubes, each of which has four expanded sections equidistantly spaced along the tube axis and at points adjacent to those on the other tubes. The maximum cross-sectional diameter of the expanded sections is about four times the diameter of the cylindrical part of the tubes.

As a result of the increased cooling surface and of the improved fluidization due to constriction of the reaction space at regular intervals, the reaction temperature is more easily controlled and the efficiency of conversion of carbon monoxide to $C_3$ and heavier hydrocarbons is materially increased.

As will be evident to those skilled in the art, various modifications of this invention can be made or followed in the light of the foregoing disclosure and discussion without departing from the spirit or scope of the disclosure or from the scope of the claims.

I claim:

1. A reactor comprising in combination a substantially vertically disposed reaction chamber enclosing a reaction zone; inlet means for reactant materials in the lower portion of said chamber; cooling means within said chamber, which cooling means materially restrict the cross sectional area of said chamber at spaced intervals through at least a portion of the length of said chamber, said cooling means forming reaction zone sections of successively smaller volume from the bottom to the top of said chamber; and effluent outlet means in the upper portion of said chamber.

2. A reactor comprising in combination a substantially vertically disposed closed outer shell; reactant material inlet means within the lower portion of said shell; coolant conduits having enlarged outer diameter portions spaced successively closer together from their lower to their upper ends, said conduits being spaced about and longitudinally disposed within said shell in such manner as to situate the lower set of enlarged conduit portions on substantially the same horizontal plane and each successive set of enlarged portions on substantially the same horizontal plane, thereby forming successive substantially unrestricted zones within said shell, which zones have successively less volume from the lower to the upper portion of said shell; coolant inlet means communicating with said coolant conduits through the walls of said shell; coolant outlet means communicating between said conduits and the exterior of said shell; and effluent outlet means communicating between the upper unrestricted zone and the exterior of said shell.

3. The reactor of claim 2, wherein said cooling conduits are connected in series.

4. The reactor of claim 2, wherein said cooling conduits are connected in pairs at their lower ends, said coolant outlet means comprises an outlet header together with an outlet conduit; and catalyst outlet means in the lower portion of said chamber.

5. The reactor of claim 2, wherein said inlet for reactant materials comprises an upwardly expanding substantially conical shaped header member having a perforate closure member closing off the enlarged end of said header member; reactant material inlet conduit means communicating between a reactant material supply source and the lower portion of said inlet header member; and catalyst outlet means in the lower portion of said chamber.

6. The reactor of claim 2, wherein the outer diameter of the conduits is enlarged by expansion members affixed to the exterior of said cooling coil conduits at adjacent points spaced throughout their length.

7. A method of synthesizing hydrocarbons by the reaction of hydrogen and carbon monoxide which comprises in combination the steps of passing a synthesis gas comprising hydrogen and carbon monoxide into an injection zone; injecting said synthesis gas into a first substantially unrestricted portion of a reaction zone at such a velocity as to substantially fluidize particulate catalyst in said reaction zone portion; reducing said gas velocity in said unrestricted zone portion, passing said synthesis gas and reaction products through a restricted zone within said reaction zone and into a second substantially unrestricted reaction zone portion at a velocity sufficient to substantially fluidize particulate catalyst in said second reaction zone portion; reducing said gas velocity in said second reaction zone portion; similarly passing said synthesis gas and reaction products through at least one more restricted zone and at least one more substantially unrestricted reaction zone portion; passing a relatively cool heat exchange material in indirect heat exchange relation with said synthesis gas and reaction products through a cooling zone within and substantially throughout the length of said restricted and unrestricted portions of said reaction zone; and removing effluent material from the upper portion of said reaction zone.

8. A method of synthesizing hydrocarbons by the reaction of hydrogen and carbon monoxide which comprises in combination the steps of passing a synthesis gas comprising hydrogen and carbon monoxide into an injection zone; injecting said synthesis gas into a first substantially unrestricted portion of a reaction zone at such a velocity as to substantially fluidize particulate catalyst in said reaction zone portion; reducing said gas velocity in said unrestricted zone portion, passing said synthesis gas and reaction products through a restricted zone within said reaction zone and into a second substantially unrestricted reaction zone portion at a velocity sufficient to substantially fluidize particulate catalyst in said second reaction zone portion; reducing said gas velocity in said second reaction zone portion; similarly passing said synthesis gas and reaction products through at least one more restricted zone and at least one more substantially unrestricted reaction zone portion; passing a relatively cool heat exchange material in indirect heat exchange relation with said synthesis gas and reaction products through a plurality of restricted and unrestricted portions of cooling zone within and substantially throughout the length of said restricted and unrestricted portions of said reaction zone; and removing effluent material from the upper portion of said reaction zone.

9. A method of synthesizing hydrocarbons by the reaction of hydrogen and carbon monoxide which comprises in combination the steps of injecting a synthesis gas comprising hydrogen and carbon monoxide into the lower portion of a reaction zone at such a velocity as to substantially fluidize particulate catalyst in the lower portion of said reaction zone; increasing the velocity of said gas by passing it upwardly through a restricted area in said reaction zone so as to fluidize particulate catalyst in a portion of said reaction zone above said restricted area; similarly passing said synthesis gas and reaction products through at least one more restricted zone and at least one more succeedingly smaller volumed portion of said reaction zone; passing a heat exchange material in indirect heat exchange relation with said synthesis gas and reaction products through cooling zones within and substantially throughout the length of said restricted and unrestricted portions of said reaction zone; and removing effluent material from the upper portion of said reaction zone.

10. A reactor comprising in combination a substantially vertically disposed closed outer shell; reactant material inlet means within the lower portion of said shell; coolant conduits spaced about and longitudinally disposed within said shell, said conduits having enlarged outer diameter portions substantially equally spaced throughout their lengths, each set of enlarged diameter portions being on substantially the same horizontal plane and the diameter of conduit sections between said enlarged portions being successively larger from the lower to the upper end of said conduits, whereby reaction zone sections of successively smaller volume are formed from the lower to the upper portions of said shell between zones restricted by said enlarged conduit portions; coolant inlet means communicating with said coolant conduits through the walls of said shell; coolant outlet means communicating between said conduits and the exterior of said shell; and effluent outlet means communicating between the upper reaction zone section and the exterior of said shell.

ALFRED CLARK.

REFERENCES CITED

The following references are of record in the file of this patent:

UNITED STATES PATENTS

| Number | Name | Date |
|---|---|---|
| 514,338 | Row | Feb. 6, 1894 |
| 1,799,858 | Miller | Apr. 7, 1931 |
| 2,394,680 | Gerhold et al. | Feb. 12, 1946 |
| 2,415,756 | Le Roi et al. | Feb. 11, 1947 |
| 2,417,164 | Huber, Jr. | Mar. 11, 1947 |
| 2,433,798 | Voorhees | Dec. 30, 1947 |
| 2,434,537 | Barr et al. | Jan. 13, 1948 |
| 2,446,925 | Hemminger | Aug. 30, 1948 |